(12) United States Patent
Hsiao et al.

(10) Patent No.: US 9,312,748 B2
(45) Date of Patent: Apr. 12, 2016

(54) POWER CONVERSION SYSTEM OF MULTI-PHASE GENERATOR AND METHOD OF OPERATING THE SAME

(71) Applicant: DELTA ELECTRONICS, INC., Guishan Township (TW)

(72) Inventors: Chih-Hung Hsiao, Guishan Township (TW); Jo-Fang Wei, Guishan Township (TW); Li-Wei Hsiao, Guishan Township (TW)

(73) Assignee: DELTA ELECTRONICS, INC. (TW)

( * ) Notice: Subject to any disclaimer, the term of this patent is extended or adjusted under 35 U.S.C. 154(b) by 88 days.

(21) Appl. No.: 14/468,610

(22) Filed: Aug. 26, 2014

(65) Prior Publication Data

US 2015/0357911 A1 Dec. 10, 2015

(30) Foreign Application Priority Data

Jun. 6, 2014 (CN) .......................... 2014 1 0249493

(51) Int. Cl.
*H02M 1/42* (2007.01)
*H02M 7/04* (2006.01)
*H02J 5/00* (2006.01)

(52) U.S. Cl.
CPC ............... *H02M 1/4216* (2013.01); *H02J 5/00* (2013.01); *H02M 7/04* (2013.01)

(58) Field of Classification Search
CPC ....... H02M 1/12; H02M 1/32; H02M 1/4225; H02M 7/217; Y02B 70/126; H02H 7/127; G05F 1/70
USPC ...................... 363/39, 44, 52, 78, 84, 89, 125; 323/205, 207
See application file for complete search history.

(56) References Cited

U.S. PATENT DOCUMENTS

| | | | | |
|---|---|---|---|---|
| 5,132,606 A * | 7/1992 | Herbert | .................. | H02J 9/061 323/266 |
| 6,072,302 A * | 6/2000 | Underwood | .............. | H02J 3/38 322/17 |
| 6,452,289 B1 * | 9/2002 | Lansberry | ................. | H02J 3/32 307/25 |
| 7,719,248 B1 * | 5/2010 | Melanson | ........... | H02M 1/4225 323/222 |
| 2005/0212501 A1 * | 9/2005 | Acatrinei | .................. | G05F 1/70 323/283 |
| 2007/0247091 A1 * | 10/2007 | Maiocchi | .............. | H02M 3/156 318/400.04 |
| 2008/0198638 A1 * | 8/2008 | Reinberger | ......... | H02M 3/3376 363/74 |
| 2010/0026208 A1 * | 2/2010 | Shteynberg | ........ | H05B 33/0815 315/297 |
| 2011/0115399 A1 * | 5/2011 | Sadwick | ........... | H05B 33/0818 315/287 |
| 2013/0077362 A1 * | 3/2013 | Kumar | ................ | H02M 1/4225 363/49 |
| 2014/0265935 A1 * | 9/2014 | Sadwick | ........... | H05B 33/0848 315/307 |
| 2015/0194877 A1 * | 7/2015 | Hsiao | ...................... | H02M 3/07 363/70 |

* cited by examiner

*Primary Examiner* — Adolf Berhane
(74) *Attorney, Agent, or Firm* — Hauptman Ham, LLP (57) ABSTRACT

A power conversion system of a multi-phase generator used to provide a power factor correction for a multi-phase generator. The power conversion system of the multi-phase generator includes a multi-phase power conversion unit and a control unit. The multi-phase power conversion unit receives a plurality of generator voltages and a plurality of generator currents generated from the multi-phase generator, and converts the generator voltages into a DC voltage and a DC current. The control unit controls the generator currents to linearly follow the generator voltages, therefore the power factor correction for the multi-phase generator is achieved.

18 Claims, 6 Drawing Sheets

POWER CONVERSION SYSTEM OF MULTI-PHASE GENERATOR AND METHOD OF OPERATING THE SAME

BACKGROUND

1. Technical Field

The present invention relates generally to a power conversion system of a generator and a method of operating the same, and more particularly to a power conversion system with a power factor correction function of a multi-phase generator and a method of operating the same.

2. Description of Related Art

Figure 1:
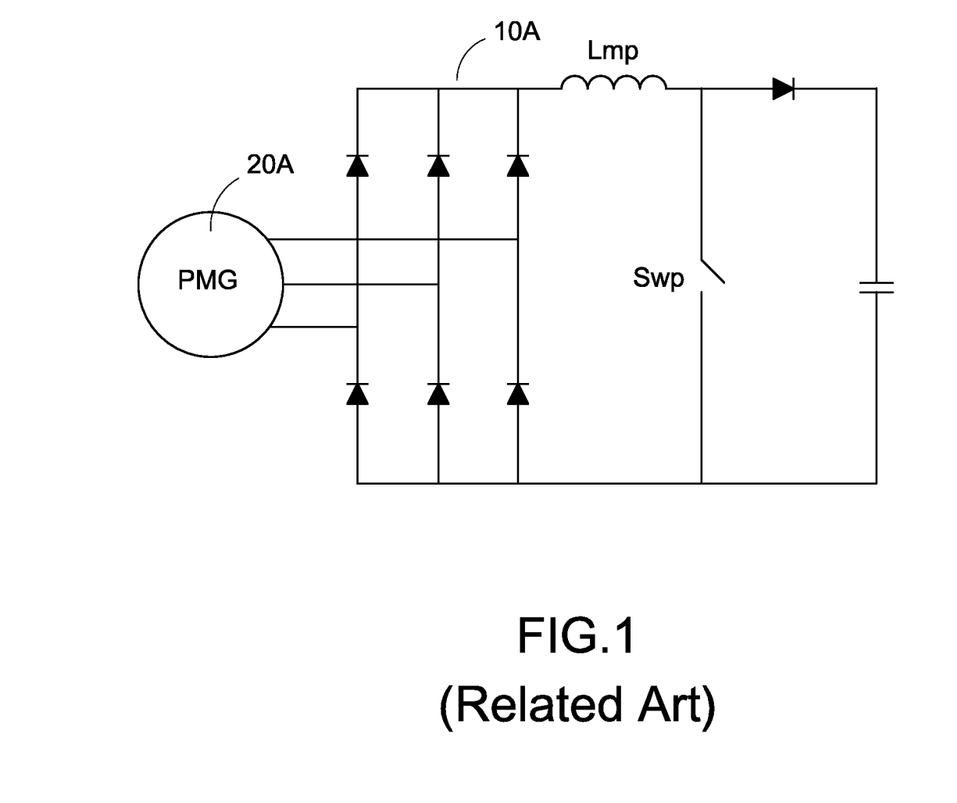
FIG. 1 is a schematic circuit diagram of a related art power generation system with a passive rectifying converter.

At present, the common converters of the power generation system can be roughly divided into two system structures: a passive rectification structure and an active rectification structure. Reference is made to FIG. 1 which is a schematic circuit diagram of a related art power generation system with a passive rectifying converter. The power generation system has a passive full-bridge rectifier 10A electrically coupled to a permanent magnet generator (PMG) 20A. The passive full-bridge rectifier 10A is provided to convert a three-phase AC voltage outputted from the permanent magnet generator 20A into a single-phase DC voltage, and also an inductance element Lmp and a switch element Swp are operated to implement the power conversion. For the power generation system with the passive rectifier, the major advantage thereof is that the overall efficiency is maximal because only one drive switch is switched to achieve the power conversion and the caused conversion losses are very small. Particularly, the smaller power generators or lower wind speed operations are adopted. However, the passive rectifying structure cannot actively control the power factor. Also, the ripple torque coupled from the output ripple current generated from the permanent magnet generator 20A causes vibration and noises because the passive full-bridge rectifier 10A can only obtain peak-voltage energy of the three-phase voltage.

Figure 2:
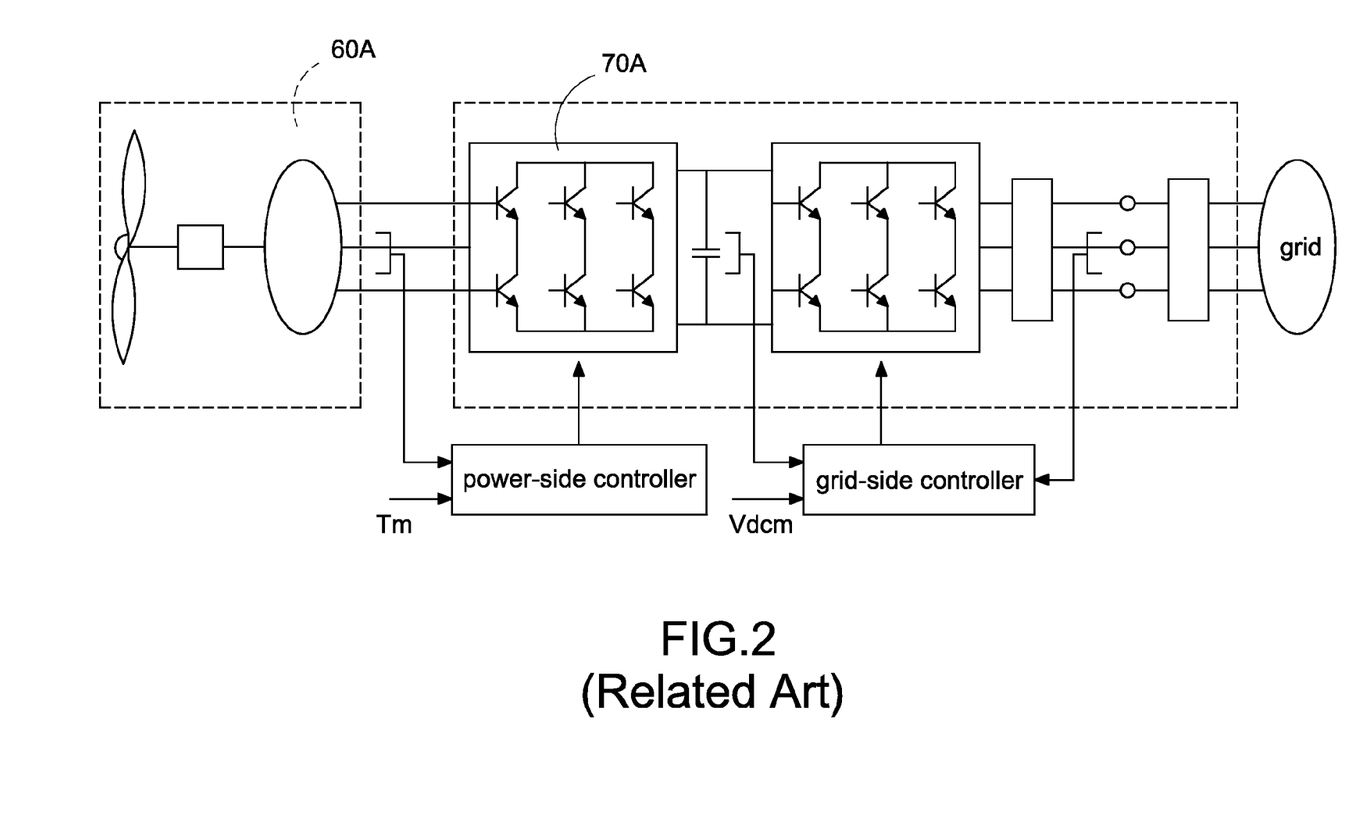
FIG. 2 is a schematic circuit diagram of a related art power generation system with an active rectifying converter.

Reference is made to FIG. 2 which is a schematic circuit diagram of a related art power generation system with an active rectifying converter. There are six active switches and three passive inductors installed in a power side converter 70A. In addition, a position detector installed on a rotor of the generator 60A is provided to acquire instantaneous rotation speed and non-fixed frequency and phase. Accordingly, the frequencies with same frequency and phase following the fundamental wave are required for the instantaneous rotation speed control and the SVPWM (space vector PWM) control to complete the power conversion. Further, the full-voltage power can be implemented because the controller used in the active rectifying structure can synchronously provide power conversion followed by the three-phase AC voltage. However, it is unfavorable for controllers to provide power conversion for various permanent magnet generators since the six active switches need to be simultaneously driven to result in complicated controls and larger power losses.

Especially, because of frequent variation in wind speed and wind direction, the wind power is more unstable compared to the electricity power generated from the electric grids. In addition, it is very difficult to implement the power factor control for the unstable power source.

Accordingly, it is desirable to provide a power conversion system of a multi-phase generator and a method of operating the same to overcome difficulty of controlling the power factor for the unstable power source by low-loss and simple-control designs.

SUMMARY

An object of the present invention is to provide a power conversion system of a multi-phase generator to solve the above-mentioned problems. Accordingly, the power conversion system of a multi-phase generator provides a power factor correction for a multi-phase generator. The power conversion system of the multi-phase generator includes a multi-phase power conversion unit and a control unit. The multi-phase power conversion unit receives a plurality of generator voltages and a plurality of generator currents generated from the multi-phase generator, and converts the generator voltages to output a DC voltage and a DC current. The control unit includes an outer control loop, a discontinuous current limiter, and an inner control loop. The outer control loop receives the DC voltage and one of the generator voltages, and outputs at least one current command. The discontinuous current limiter receives the at least one current command to limit a maximum value of the at least one current command, and outputs the at least one current command to be a current limiting command. The inner control loop receives the DC current and the current limiting command to control the multi-phase power conversion unit. The control unit controls the current limiting command to control the generator currents to linearly follow the generator voltages, therefore the power factor correction for the multi-phase generator is achieved.

Another object of the present invention is to provide a method of operating a power conversion system of a multi-phase generator to solve the above-mentioned problems. Accordingly, the power conversion system of a multi-phase generator provides a power factor correction for a multi-phase generator. The method includes steps of: (a) providing a multi-phase power conversion unit; the multi-phase power conversion unit configured to receive a plurality of generator voltages and a plurality of generator currents generated from the multi-phase generator, and convert the generator voltages to output a DC voltage and a DC current; (b) providing a control unit; the control unit having an outer control loop, a discontinuous current limiter, and an inner control loop; (c) receiving the DC voltage and one of the generator voltages by the outer control loop, and outputting at least one current command; receiving the at least one current command by the discontinuous current limiter to limit a maximum value of the at least one current command, and outputting the at least one current command to be a current limiting command; receiving the DC current and the current limiting command by the inner control loop to control the multi-phase power conversion unit; and (d) controlling the current limiting command by the control unit to control the generator currents to linearly follow the generator voltages, therefore the power factor correction for the multi-phase generator is achieved.

It is to be understood that both the foregoing general description and the following detailed description are exemplary, and are intended to provide further explanation of the present invention as claimed. Other advantages and features of the present invention will be apparent from the following description, drawings and claims.

BRIEF DESCRIPTION OF DRAWINGS

The features of the present invention believed to be novel are set forth with particularity in the appended claims. The present invention itself, however, may be best understood by reference to the following detailed description of the present invention, which describes an exemplary embodiment of the present invention, taken in conjunction with the accompanying drawings, in which:

DETAILED DESCRIPTION

Reference will now be made to the drawing figures to describe the present invention in detail.

Figure 3:
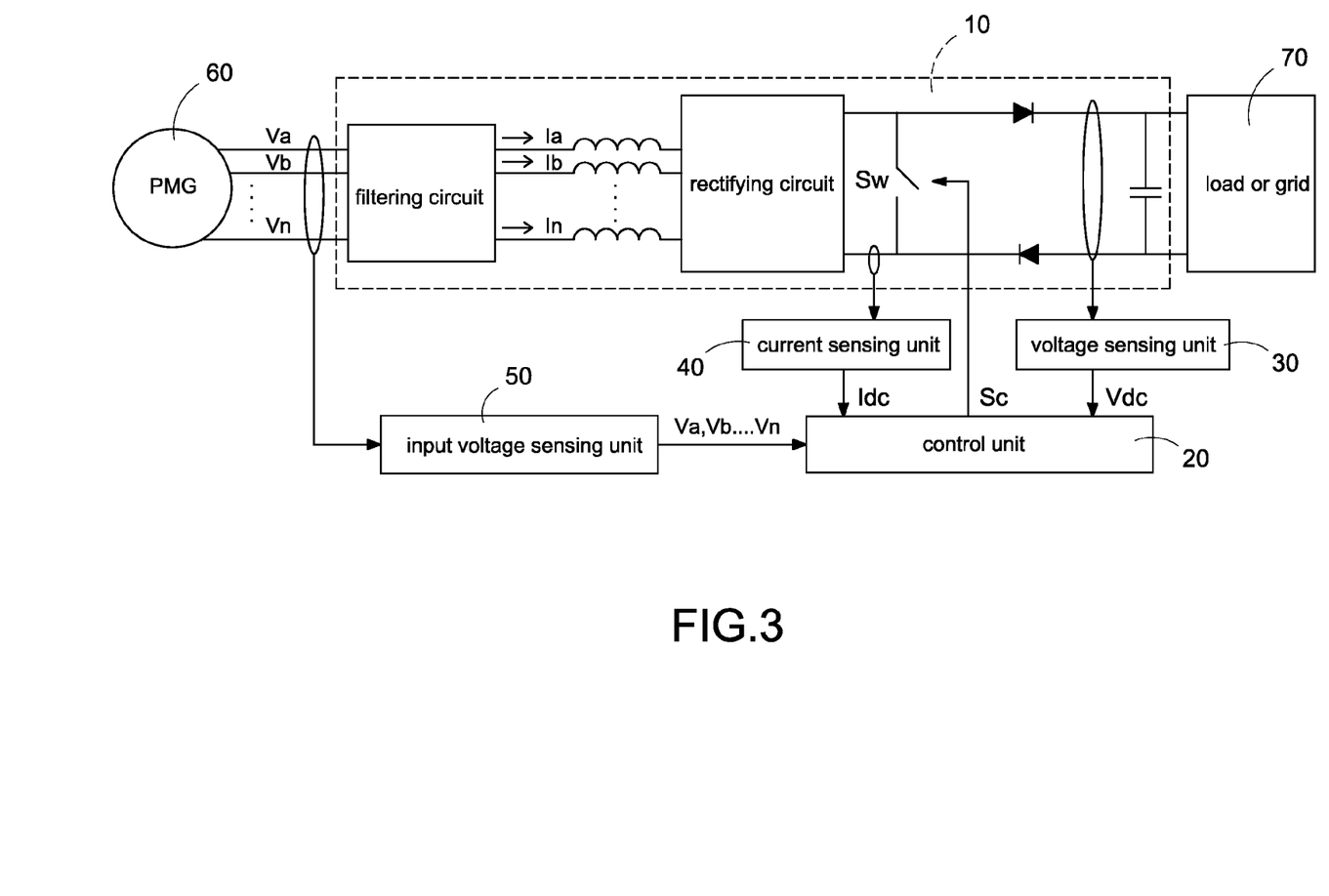
FIG. 3 is a circuit block diagram of a power conversion system of a multi-phase generator according to the present invention.

Reference is made to FIG. 3 which is a circuit block diagram of a power conversion system of a multi-phase generator according to the present invention. The power conversion system of the multi-phase generator provides a power factor correction for a multi-phase generator 60. Especially, the multi-phase generator 60 can be a permanent magnet generator (PMG), but not limited. In particular, the "multi-phase" means that the generator is not limited to be a three-phase generator, and even the phase number of the generator is greater than three. In addition, the multi-phase power generated from the generator is different from the conventional three-phase power generated from the electric grid. The multi-phase generator is driven by an external force, such as wind power, hydraulic power, vapor power, or even human power. However, the embodiments are only exemplified but are not intended to limit the scope of the invention. For convenience, the wind power is exemplified to further demonstrate the present invention. In addition, the controller used in this present invention is a power conversion system which provide electromechanical energy coupling to the stator windings of the generator, and the controller can be installed inside the generator.

The power conversion system of the multi-phase generator includes a multi-phase power conversion unit 10 and a control unit 20. The multi-phase power conversion unit 10 receives a plurality of generator voltages Va, Vb, . . . , Vn and a plurality of generator currents Ia, Ib, . . . , In generated from the multi-phase generator 60, and converts the generator voltages Va, Vb, . . . , Vn to output a DC voltage Vdc and a DC current Idc to supply power to a load 70 or feedback power to a grid 70. In particular, the symbol "a" indicates a-phase voltage or current, the symbol "b" indicates b-phase voltage or current, and the symbol "n" indicates n-phase voltage or current; in which, n is greater than or equal to 3.

Especially, multi-phase inductors at the power side of the multi-phase power conversion unit 10 are used to achieve the power conversions, and the operations of energy storing and energy releasing of the inductors are implemented by the switch units after a rectification operation. More specifically, the currents flowing through the inductors linearly follow the corresponding AC voltages when the inductors with zero initial energy are operated in the energy-storing condition or the energy-releasing condition during a fixed cycle. In other words, the inductor currents are proportionally varied with the polarity and magnitude of the AC voltages after the inductor currents are fully discharged during one cycle and enter next cycle.

The discontinuous inductor current is blocked by a filtering circuit to smooth the generator current so as to avoid generating high-ripple torque by the generator. In addition, the multi-phase discontinuous AC inductor current is rectified by the rectifying circuit to generate a single-phase discontinuous DC current. The discontinuous DC current is filtered to acquire a continuous DC current by a signal filter or a digital filter inside the microcontroller. Accordingly, the continuous DC current is to be a peak value of the output current of the generator, and the continuous DC current is used for the inner control loop to control the generator currents.

The control unit 20 includes an outer control loop 202, a discontinuous current limiter 204, and an inner control loop 206. The outer control loop 202 receives the DC voltage Vdc and one of the generator voltages Va, Vb, . . . , Vn, and outputs at least one current command. The discontinuous current limiter 204 receives the at least one current command to limit a maximum value of the at least one current command, and outputs the at least one current command to be a current limiting command I*. The inner control loop 206 receives the DC current Idc and the current limiting command I* to control the multi-phase power conversion unit 10. In particular, the current limiting command I* outputted from the discontinuous current limiter 204 to control the generator currents Ia, Ib, . . . , In linearly following the generator voltages Va, Vb, . . . , Vn, therefore the power factor correction of the multi-phase generator 60 is achieved. The detailed operation of the power conversion system of the multi-phase generator will be described hereinafter as follows.

For convenience, a three-phase generator is exemplified to further demonstrate the present invention. In other words, the multi-phase power conversion unit 10 receives three-phase generator voltages Va, Vb, Vc and three-phase generator currents Ia, Ib, Ic generated from the three-phase generator 60, and converts the three-phase generator voltages Va, Vb, Vc to output the DC voltage Vdc and the DC current Idc. The power conversion system of the multi-phase generator further has a voltage sensing unit 30, a current sensing unit 40, and an input voltage sensing unit 50. The input voltage sensing unit 50 is connected between a power output terminal of the three-phase generator 60 and the control unit 20. The input voltage sensing unit 50 senses the three-phase generator voltages Va, Vb, Vc generated from the three-phase generator 60, and the sensed three-phase generator voltages Va, Vb, Vc are transmitted to the control unit 20. The voltage sensing unit 30 is connected between the multi-phase power conversion unit 10 and the control unit 20. The voltage sensing unit 30 senses the DC voltage Vdc converted and outputted from the multi-phase power conversion unit 10, and the sensed DC voltage Vdc is transmitted to the control unit 20. The current sensing unit 40 is connected between the multi-phase power conversion unit 10 and the control unit 20. The current sensing unit 40 senses the DC current Idc converted and outputted from the multi-phase power conversion unit 10, and the sensed DC current Idc is transmitted to the control unit 20.

Figure 4:
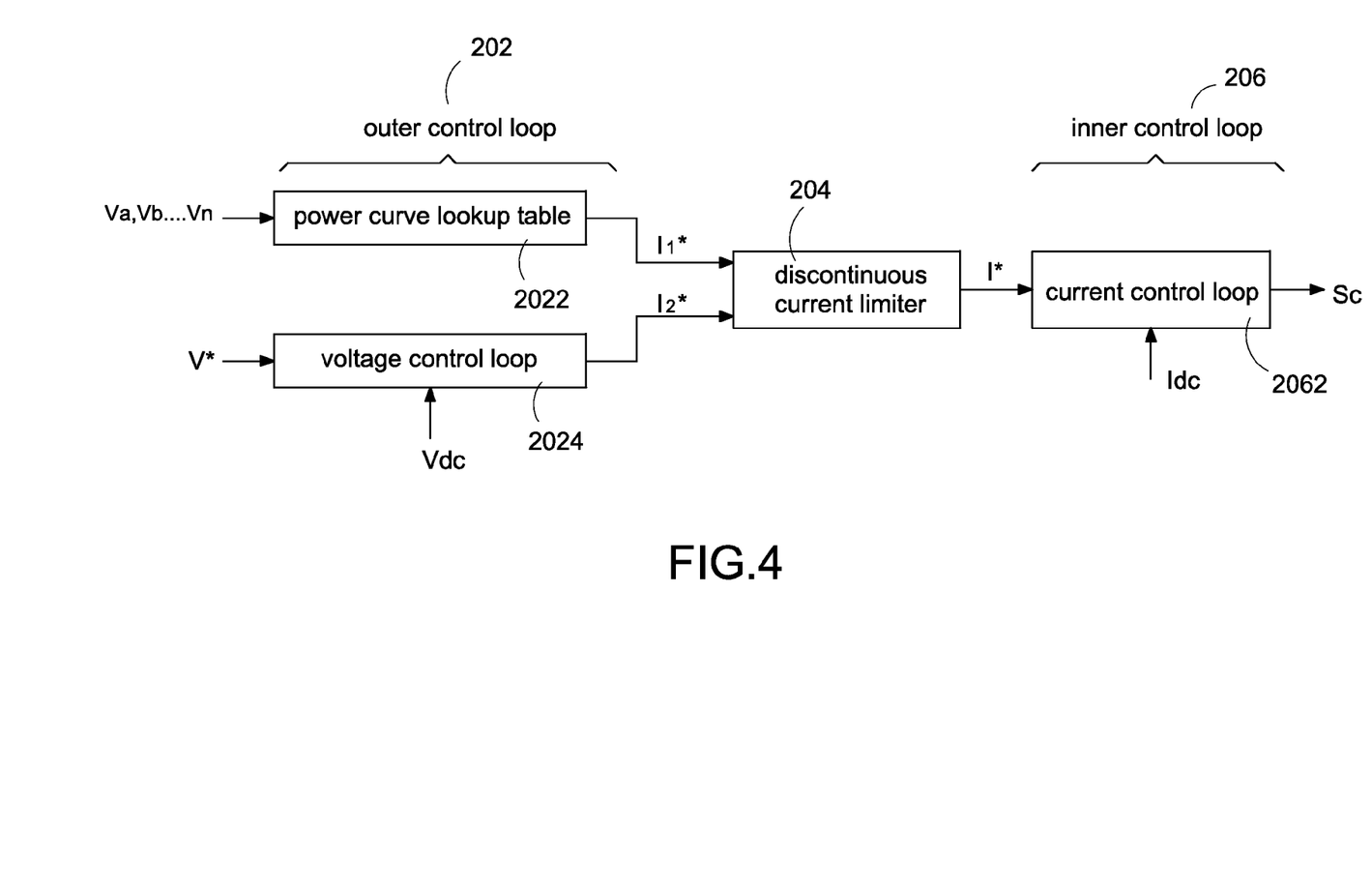
FIG. 4 is a schematic block diagram of a control unit of the power conversion system of the multi-phase generator according to the present invention.

Reference is made to FIG. 4 which is a schematic block diagram of a control unit of the power conversion system of the multi-phase generator according to the present invention. As mentioned above, the control unit 20 includes the outer control loop 202, the discontinuous current limiter 204, and the inner control loop 206. The outer control loop 202 has a power curve lookup table 2022 and a voltage control loop 2024. The power curve lookup table 2022 receives one of the three-phase generator voltages Va, Vb, Vc to output a first current command I1*. The voltage control loop 2024 receives the DC voltage Vdc and a voltage command V*, and compares the DC voltage Vdc and the voltage command V* to output a second current command I2*. More specifically, the voltage control loop 2024 amplifies a voltage error between the voltage command V* and the DC voltage Vdc, namely (V*−Vdc) to output the second current command I2*.

The discontinuous current limiter 204 receives the first current command I1* and the second current command I2* to limit the maximum value of the first current command I1* and the maximum value of the second current command I2*, and outputs the first current command I1* or the second current command I2* to be the current limiting command I*. The inner control loop 206 has a current control loop 2062. The current control loop 2062 receives the DC current Idc and the current limiting command I*, and compares the DC current Idc and the current limiting command I* to output a control signal Sc, thus controlling the multi-phase power conversion unit 10. More specifically, the current control loop 2062 amplifies a current error between the current limiting command I* and the DC current Idc, namely (I*−Idc) to output the control signal Sc. In particular, the control signal Sc is a pulse-width modulation (PWM) signal. Also, the power conversion system of the multi-phase generator further includes a pulse-width modulation (PWM) drive unit. The multi-phase power conversion unit 10 further includes a switch unit Sw, and the switch unit Sw is controlled by the control signal Sc outputted from the current control loop 2062 to control a load operation or a brake operation of the multi-phase generator 60. More specifically, the multi-phase generator 60 is braked in a short-circuit manner when the control signal Sc is high-level to turn on the switch unit Sw. On the contrary, the multi-phase generator 60 is controlled according to the voltage-current curves to implement the maximum power point tracking (MPPT) operation when the control signal Sc is high-frequency to switch the switch unit Sw.

Figure 5A:
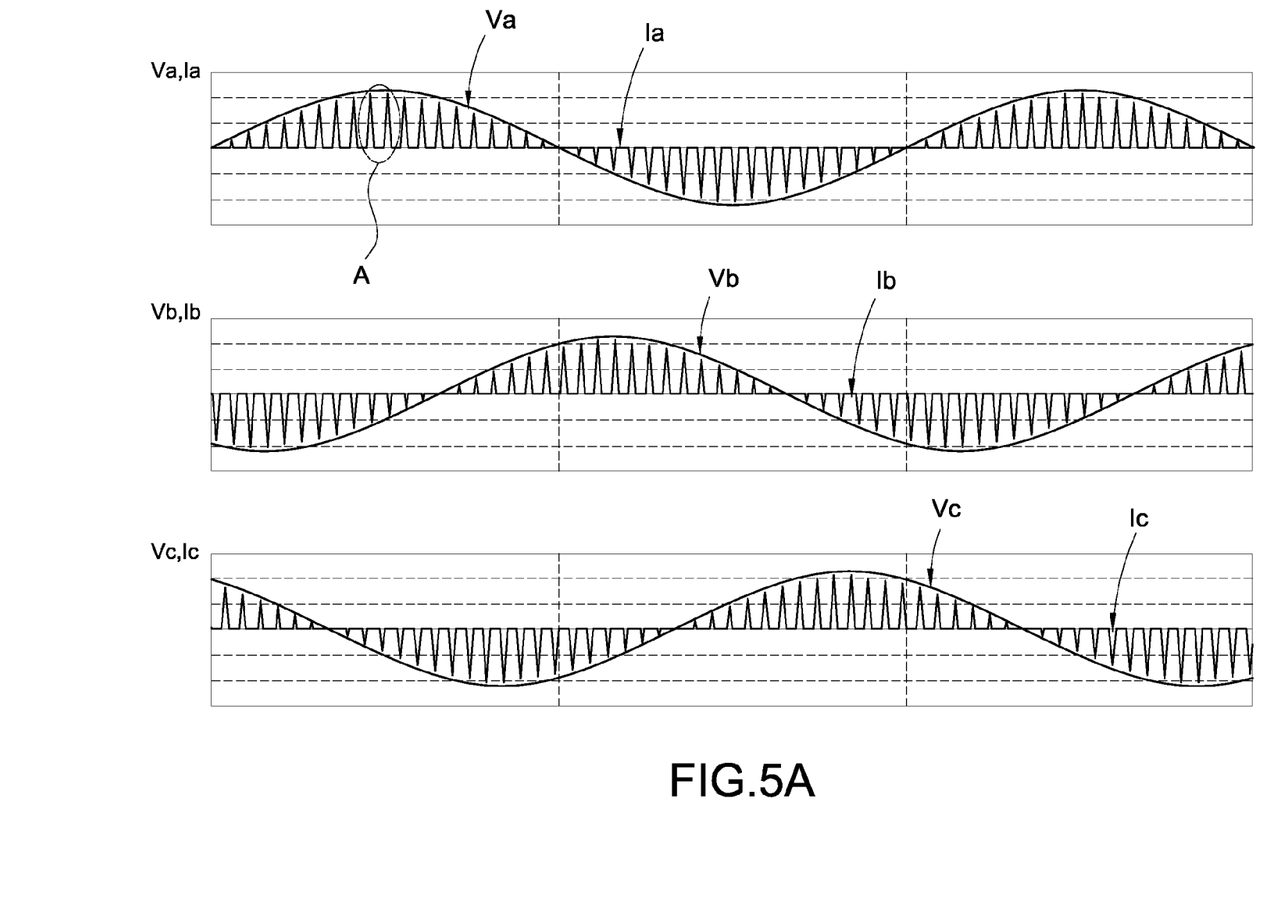
FIG. 5A is a waveform graph of generator voltages and generator currents of the power conversion system of the multi-phase generator according to the present invention.
Figure 5B:
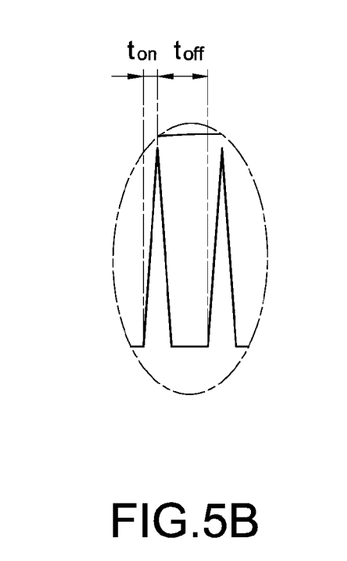
FIG. 5B is a partial enlarged view of the generator current of the multi-phase generator power conversion system according to the present invention.

Reference is made to FIG. 5A which is a waveform graph of generator voltages and generator currents of the power conversion system of the multi-phase generator according to the present invention. From top to bottom, FIG. 5A illustrates a-phase generator voltage Va and generator current Ia, b-phase generator voltage Vb and generator current Ib, and c-phase generator voltage Vc and generator current Ic. The discontinuous current limiter 204 of the control unit 20 outputs the current limiting command I* with the limited maximum value to control the multi-phase power conversion unit 10 to be operated at a discontinuous conduction mode (DCM) so as to control the generator currents Ia, Ib, Ic linearly following the generator voltages Va, Vb, Vc, therefore the power factor correction of the multi-phase generator 60 is achieved. In addition, reference is made to FIG. 5B which is a partial enlarged view of the generator current of the multi-phase generator power conversion system according to the present invention. It is obvious to find out that the multi-phase power conversion unit 10 is operated at the discontinuous conduction mode (DCM). In which, "ton" expresses the turn-on time of the switch unit Sw, and "toff" expresses the turn-off time of the switch unit Sw.

Figure 6:
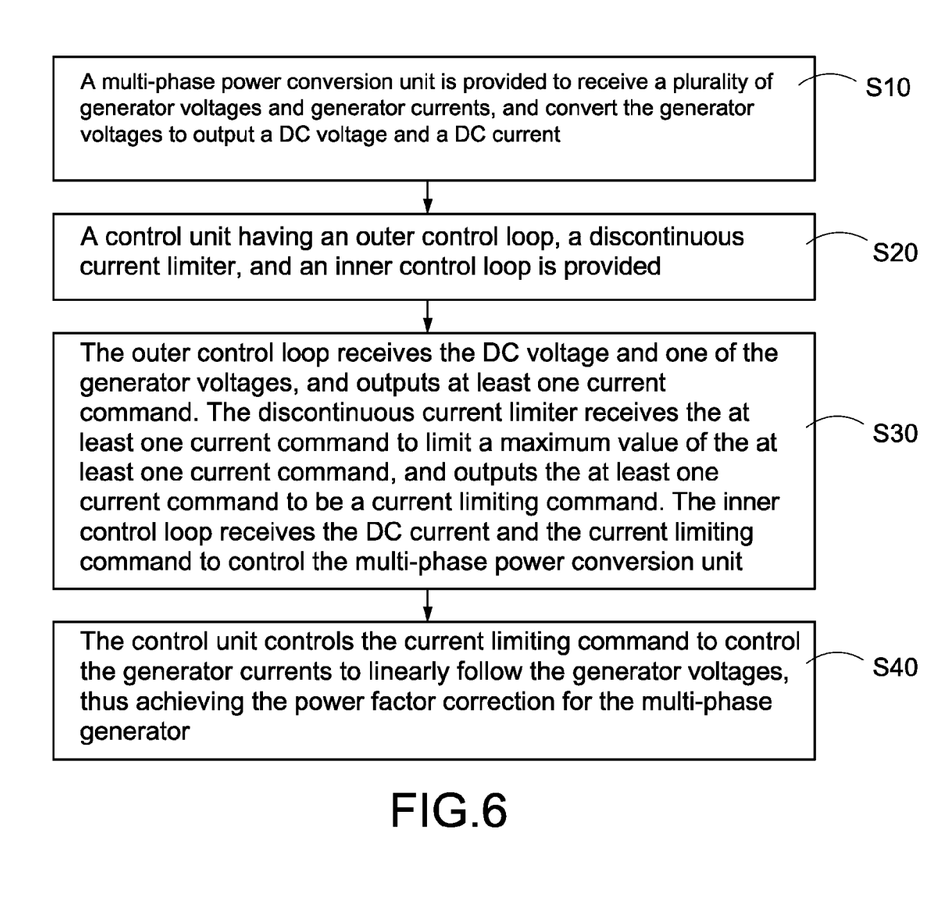
FIG. 6 is a flowchart of a method of operating a power conversion system of a multi-phase generator according to the present invention.

Reference is made to FIG. 6 which is a flowchart of a method of operating a power conversion system of a multi-phase generator according to the present invention. The method provides a power factor correction for a multi-phase generator, and the method includes following steps. First, a multi-phase power conversion unit is provided to receive a plurality of generator voltages and a plurality of generator currents generated from the multi-phase generator, and convert the generator voltages to output a DC voltage and a DC current (S10). Especially, the multi-phase generator 60 can be a permanent magnet generator (PMG), but not limited. In particular, the "multi-phase" means that the generator is not limited to be a three-phase generator, and even the phase number of the generator is greater than three. In addition, the multi-phase power generated from the generator is different from the conventional three-phase power generated from the electric grid. The multi-phase generator is driven by an external force, such as wind power, hydraulic power, vapor power, or even human power. However, the embodiments are only exemplified but are not intended to limit the scope of the invention. For convenience, the wind power is exemplified to further demonstrate the present invention. In addition, the controller used in this present invention is a power conversion system which provide electromechanical energy coupling to the stator windings of the generator, and the controller can be installed inside the generator.

After a control unit is provided, and the control unit has an outer control loop, a discontinuous current limiter, and an inner control loop (S20). The outer control loop receives the DC voltage and one of the generator voltages, and outputs at least one current command. The discontinuous current limiter receives the at least one current command to limit a maximum value of the at least one current command, and outputs the at least one current command to be a current limiting command. The inner control loop receives the DC current and the current limiting command to control the multi-phase power conversion unit (S30). Finally, the control unit controls the current limiting command to control the generator currents to linearly follow the generator voltages, therefore the power factor correction for the multi-phase generator (S40) is achieved.

In conclusion, the present invention has following advantages:

1. The designs of low power consumption and simple control of the power conversion system with independent frequency and phase are provided to implement the power factor correction function;

2. The multi-phase structure (unlike the three-phase power generated from the electric grid) of the parallel-connected power conversion system and the method of operating the same can be used to broader and more flexible applications; and 3. The multi-phase power conversion unit 10 is controlled to be operated at the discontinuous conduction mode (DCM) so as to control the generator currents linearly following the generator voltages Vb, Vc, therefore the power factor correction of the multi-phase generator 60 is achieved and the control robustness of the system for the unstable power source is increased.

Although the present invention has been described with reference to the preferred embodiment thereof, it will be understood that the present invention is not limited to the details thereof. Various substitutions and modifications have been suggested in the foregoing description, and others will occur to those of ordinary skill in the art. Therefore, all such substitutions and modifications are intended to be embraced within the scope of the present invention as defined in the appended claims.

What is claimed is:

1. A power conversion system of a multi-phase generator, providing a power factor correction for a multi-phase generator, the power conversion system comprising:

a multi-phase power conversion unit configured to receive a plurality of generator voltages and a plurality of generator currents generated from the multi-phase generator, and convert the generator voltages to output a DC voltage and a DC current; and a control unit comprising:
- an outer control loop configured to receive the DC voltage and one of the generator voltages, and output at least one current command;
- a discontinuous current limiter configured to receive the at least one current command to limit a maximum value of the at least one current command, and output the at least one current command to be a current limiting command; and
- an inner control loop configured to receive the DC current and the current limiting command to control the multi-phase power conversion unit;
- wherein the control unit is configured to control the current limiting command to control the generator currents to linearly follow the generator voltages.

2. The power conversion system as recited in claim 1, wherein the outer control loop comprises:
- a power curve lookup table is configured to receive one of the generator voltages to output a first current command; and
- a voltage control loop is configured to receive the DC voltage and a voltage command, and compare the DC voltage and the voltage command to output a second current command.

3. The power conversion system as recited in claim 1, wherein the inner control loop comprises:
- a current control loop is configured to receive the DC current and the current limiting command, and compare the DC current and the current limiting command to output a control signal to control the multi-phase power conversion unit.

4. The power conversion system as recited in claim 3, wherein the multi-phase power conversion unit further comprises a switch unit; the switch unit is controlled by the control signal to control a load operation or a brake operation of the multi-phase generator.

5. The power conversion system as recited in claim 2, wherein the voltage control loop is configured to amplify a voltage error between the voltage command and the DC voltage, and output the second current command.

6. The power conversion system as recited in claim 3, wherein the current control loop is configured to amplify a current error between the current limiting command and the DC current, and output the control signal.

7. The power conversion system as recited in claim 4, wherein the control signal is a pulse-width modulation signal; the power conversion system further comprises a PWM signal drive unit to provide the control signal to control the switch unit.

8. The power conversion system as recited in claim 1, wherein the power conversion system is configured to provide electromechanical energy coupling to stator windings of the multi-phase generator.

9. The power conversion system as recited in claim 1, wherein the multi-phase generator is externally driven by wind power, hydraulic power, vapor power, or human power.

10. A method of operating a power conversion system of a multi-phase generator, providing a power factor correction for a multi-phase generator, the method comprising steps of:
- (a) providing a multi-phase power conversion unit; the multi-phase power conversion unit configured to receive a plurality of generator voltages and a plurality of generator currents generated from the multi-phase generator, and convert the generator voltages to output a DC voltage and a DC current;
- (b) providing a control unit; the control unit having an outer control loop, a discontinuous current limiter, and an inner control loop;
- (c) receiving the DC voltage and one of the generator voltages by the outer control loop, and outputting at least one current command; receiving the at least one current command by the discontinuous current limiter to limit a maximum value of the at least one current command, and outputting the at least one current command to be a current limiting command; receiving the DC current and the current limiting command by the inner control loop to control the multi-phase power conversion unit; and
- (d) controlling the current limiting command by the control unit to control the generator currents to linearly follow the generator voltages.

11. The method as recited in claim 10, wherein the outer control loop comprises:
- a power curve lookup table is configured to receive one of the generator voltages to output a first current command; and
- a voltage control loop is configured to receive the DC voltage and a voltage command, and compare the DC voltage and the voltage command to output a second current command.

12. The method as recited in claim 10, wherein the inner control loop comprises:
- a current control loop is configured to receive the DC current and the current limiting command, and compare the DC current and the current limiting command to output a control signal to control the multi-phase power conversion unit.

13. The method as recited in claim 12, wherein the multi-phase power conversion unit further comprises a switch unit; the switch unit is controlled by the control signal to control a load operation or a brake operation of the multi-phase generator.

14. The method as recited in claim 11, wherein the voltage control loop is configured to amplify a voltage error between the voltage command and the DC voltage, and output the second current command.

15. The method as recited in claim 12, wherein the current control loop is configured to amplify a current error between the current limiting command and the DC current, and output the control signal.

16. The method as recited in claim 12, wherein the control signal is a pulse-width modulation signal; the power conversion system further comprises a PWM signal drive unit to provide the control signal to control the switch unit.

17. The method as recited in claim 10, wherein the power conversion system is configured to provide electromechanical energy coupling to stator windings of the multi-phase generator.

18. The method as recited in claim 10, wherein the multi-phase generator is externally driven by wind power, hydraulic power, vapor power, or human power.

* * * * *